United States Patent
Gerdes et al.

(10) Patent No.: US 11,545,922 B2
(45) Date of Patent: Jan. 3, 2023

(54) POWER BASED PULSE INJECTION CONTROL FOR SR SELF SENSING

(71) Applicant: Caterpillar Inc., Peoria, IL (US)

(72) Inventors: Jesse Ray Gerdes, Dunlap, IL (US); James Michael Thorne, Dunlap, IL (US); Ahmed Khalil, Dunlap, IL (US); Jackson Wai, Dunlap, IL (US); Sajan Abdul, Dunlap, IL (US); Amara Ashfaq, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 17/154,832

(22) Filed: Jan. 21, 2021

(65) Prior Publication Data
US 2022/0231626 A1 Jul. 21, 2022

(51) Int. Cl.
*H02K 21/00* (2006.01)
*H02P 25/089* (2016.01)
*E02F 9/20* (2006.01)
*E02F 3/76* (2006.01)
*E02F 3/84* (2006.01)

(52) U.S. Cl.
CPC ............ *H02P 25/089* (2016.02); *E02F 9/207* (2013.01); *E02F 3/7609* (2013.01); *E02F 3/841* (2013.01)

(58) Field of Classification Search
CPC ........ H02P 25/089; H02P 25/08; H02P 27/06; E02F 3/841; E02F 9/207
See application file for complete search history.

(56) References Cited

U.S. PATENT DOCUMENTS

| | | | |
|---|---|---|---|
| 10,079,566 B1 | 9/2018 | Khalil et al. | |
| 10,270,379 B2 | 4/2019 | Creary et al. | |
| 2005/0067998 A1 | 3/2005 | Green | |
| 2006/0192518 A1* | 8/2006 | Adra ...................... | B60L 15/20 318/701 |

(Continued)

FOREIGN PATENT DOCUMENTS

| | | |
|---|---|---|
| CN | 104579040 A | 4/2015 |
| CN | 107276484 A | 10/2017 |
| WO | 2019190569 A1 | 10/2019 |

OTHER PUBLICATIONS

Ahmed Khalil et al: "Four-Quadrant Pulse Injection and Sliding-Mode-Observer-Based Sensorless Operation of a Switched Reluctance Machine Over Entire Speed Range Including Zero Speed", IEEE Transactions on Industry Applictions, IEEE Service Center, Piscataway, NJ, US, vol. 43, No. 3, May 1, 2007 (May 1, 2007), pp. 714-723, XP011182444, Issn: 0093-9994, DOI: 10.1109/TIA.2007. 895746 the whole document.

(Continued)

*Primary Examiner* — Karen Masih
(74) *Attorney, Agent, or Firm* — von Briesen & Roper, s.c.

(57) ABSTRACT

Power based self-sensing of a rotor position of an SR motor at mid to high speeds and low torque is achieved by an SR motor control system by comparing the motor power to an injection maximum power. A position current pulse is injected to a stator pole in response to the motor power being less than the injection maximum power. An actual stator current created by the position current pulse is compared to an estimated stator current, and a stored estimated rotor position in a memory is updated to a new estimated rotor position if the actual stator current is not equal to the estimated stator current.

20 Claims, 6 Drawing Sheets

(56) References Cited

U.S. PATENT DOCUMENTS

2020/0067433 A1  2/2020  Khalil et al.

OTHER PUBLICATIONS

Ofori Ernest et al: "A Pulse-Injection-Based Sensorless Position Estimation Method for a Switched Reluctance Machine Over a Wide Speed Range", IEEE Transactions on Industry Applictions< IEEE Service Center< Piscataway, NJ, US, vol. 51, No. 5, Sep. 1, 2015 (Sep. 1, 2015), pp. 3867-3876, XP011669065, ISSN: 0093-9994, DOI: 10.1109/TIA.2015.2420618 [retrieved on Sep. 16, 2015] the whole document.
Written Opinion and International Search Report for Int'l. Patent Appln. No. PCT/US2021/064474, dated Mar. 18, 2022 (13 pgs).

\* cited by examiner

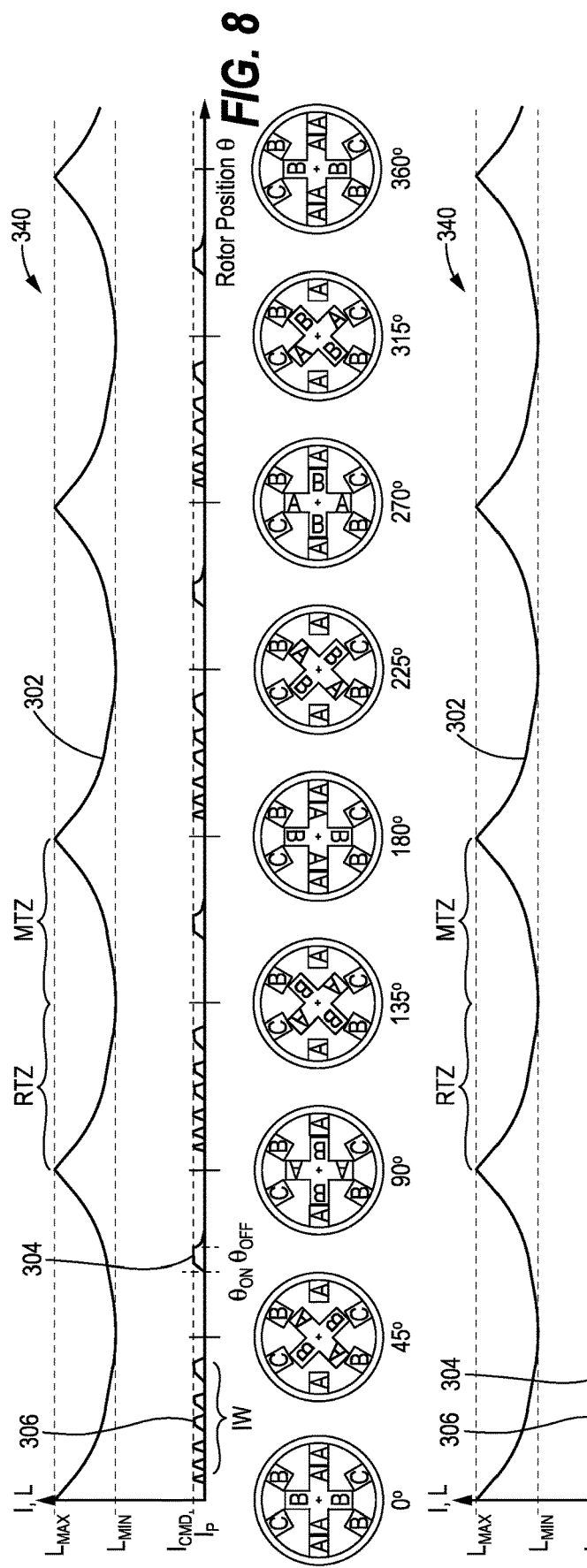
FIG. 8
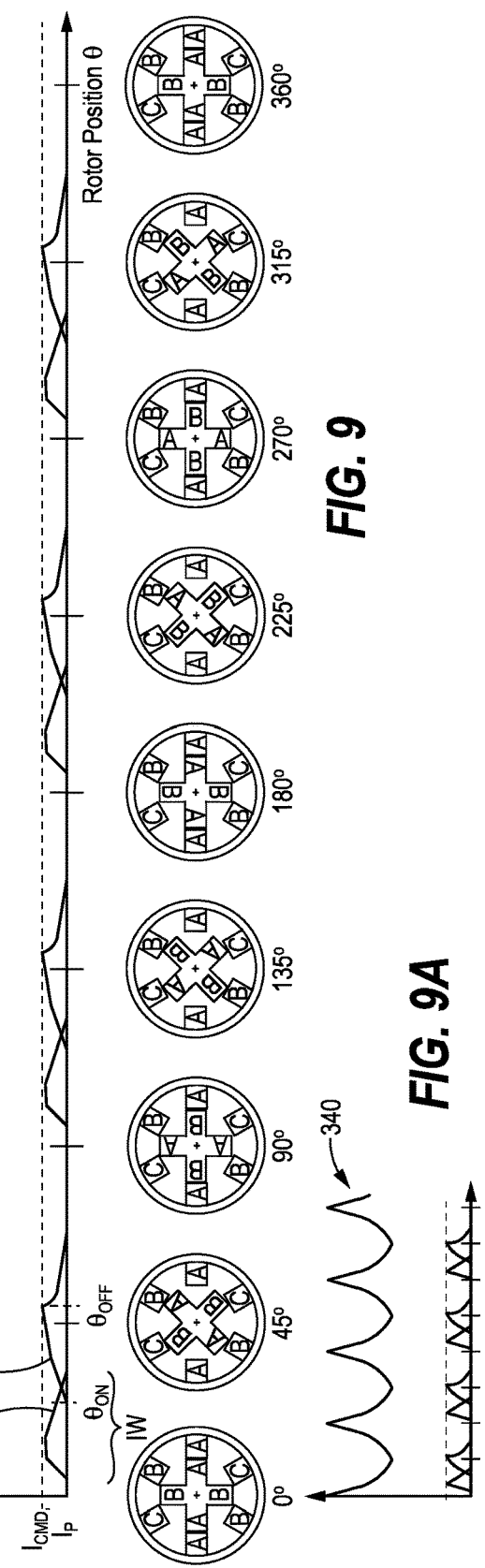
FIG. 9
FIG. 9A

POWER BASED PULSE INJECTION CONTROL FOR SR SELF SENSING

TECHNICAL FIELD

The present disclosure relates generally to a control system and, more particularly, to a switched reluctance motor control system with rotor position self-sensing.

BACKGROUND

Many work machines such track-type tractors, excavators, and the like may include a transmission coupled to a power source to enable the work machine to be repositioned or travel between locations. With increased interest in energy conservation and avoidance of use of fossil fuels, use of electric motors as the power source is becoming more common. Electric motors convert electrical energy from an energy source such as a battery into mechanical power to drive the work machine.

One type of electric motor known as a switched reluctance (SR) motor is widely used for various applications such as the above work machines due to its rugged and robust construction. An SR motor includes a rotor and a stator having a plurality of stator poles with windings. Unlike common brushed DC motor types, power is delivered to the windings in the stator of the SR motor rather than to the rotor. This arrangement greatly simplifies the mechanical design as power does not have to be delivered to a moving part, but it complicates the electrical design as some sort of switching system needs to be used to deliver power to the different windings. Some SR motors have a control system with self-sensing operation that estimates the position of the rotor relative to the stator without the use of a direct angular position sensor. Self-sensing operation is important in many applications due to the need for minimum package size, high reliability and reduced cost. Accurate determination of the angular position of the rotor at all operating speeds is vital to the performance and efficiency of the motor.

One such self-sensing control system is described in U.S. Pat. No. 10,079,566. However, at medium and high speeds with small loads on the SR motor, there may not be sufficient current to the stator due to the low power required to rotate the rotor for the self-sensing control system to estimate the position of the rotor, thereby creating risk that a command current is not transmitted to the windings of the stator poles at the correct timing so that the performance and efficiency of the SR motor is adversely affected. Therefore, there remains a need for a control system for an SR motor that provides accurate self-sensing operation during medium-to-high speed/low torque operation.

SUMMARY OF THE DISCLOSURE

In one aspect of the present disclosure, a work machine is disclosed. The work machine may include a power source, an SR motor having a stator and a rotor, an inverter operatively connected to the power source and the SR motor to control transfer of power from the power source to the SR motor, and a controller operatively connected to the SR motor and the inverter. The controller may be configured to calculate a motor power that is output by the SR motor, compare the motor power to an injection maximum power, and determine an estimated stator current for the SR motor based on a position current of a position current pulse to be injected to a stator pole of the SR motor to estimate a rotor position in response to the motor power being less than the injection maximum power. The controller may further be configured to cause the inverter to inject the position current pulse with the position current to the stator pole of the SR motor in response to the motor power being less than the injection maximum power, determine an actual stator current of the SR motor created by the position current pulse, compare the actual stator current to the estimated stator current, and set a stored estimated rotor position in a memory equal to a new estimated rotor position in response to determining that the actual stator current is not equal to the estimated stator current by an error amount that is greater than a predetermined error amount.

In another aspect of the present disclosure, a method for self-sensing a rotor position of a rotor of an SR motor is disclosed. The method may include calculating a motor power that is output by the SR motor, comparing the motor power to an injection maximum power, determining an estimated stator current for the SR motor based on a position current of a position current pulse to be injected to a stator pole of the SR motor to estimate the rotor position in response to the motor power being less than the injection maximum power, injecting the position current pulse with the position current to the stator pole of the SR motor in response to the motor power being less than the injection maximum power, determining an actual stator current of the SR motor created by the position current pulse, comparing the actual stator current to the estimated stator current, and setting a stored estimated rotor position equal to a new estimated rotor position in response to determining that the actual stator current is not equal to the estimated stator current by an error amount that is greater than a predetermined error amount.

In a further aspect of the present disclosure, an electric drive system for a work machine is disclosed. The work machine may have a frame, a traction system supporting the frame, and a power source mounted on the frame. The electric drive system may include an SR motor having a stator and a rotor, an inverter operatively connected to the power source and the SR motor to control transfer of power from the power source to the SR motor, a current sensor operatively connected to the SR motor, and a controller operatively connected to the SR motor, the inverter and the current sensor. The controller may be configured to calculate a motor power that is output by the SR motor, compare the motor power to an injection maximum power, determine an estimated stator current for the SR motor based on a position current of a position current pulse to be injected to a stator pole of the SR motor to estimate a rotor position in response to the motor power being less than the injection maximum power, cause the inverter to inject the position current pulse with the position current to the stator pole of the SR motor in response to the motor power being less than the injection maximum power, determine an actual stator current of the SR motor created by the position current pulse based on current sensor signals from the current sensor, compare the actual stator current to the estimated stator current, and set a stored estimated rotor position in a memory equal to a new estimated rotor position in response to determining that the actual stator current is not equal to the estimated stator current by an error amount that is greater than a predetermined error amount.

Additional aspects are defined by the claims of this patent.

BRIEF DESCRIPTION OF THE DRAWINGS

FIG. 8 is a graph of rotor position versus current and inductance for the SR motor of FIG. 3 at low speed and low load conditions;

FIG. 9 is a graph of rotor position versus current and inductance for the SR motor of FIG. 3 at medium-to-high speed and low load conditions;

FIG. 9A is a graph of time versus current and inductance for the SR motor of FIG. 3 at medium-to-high speed and low load conditions.

DETAILED DESCRIPTION

This disclosure relates to an SR motor control system. The SR motor control system has universal applicability to any machine utilizing such a SR motor control system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, and the like. Moreover, one or more implements may be connected to the machine and controlled using an electric motor associated with the switched reluctance motor control system described herein.

Figure 1:
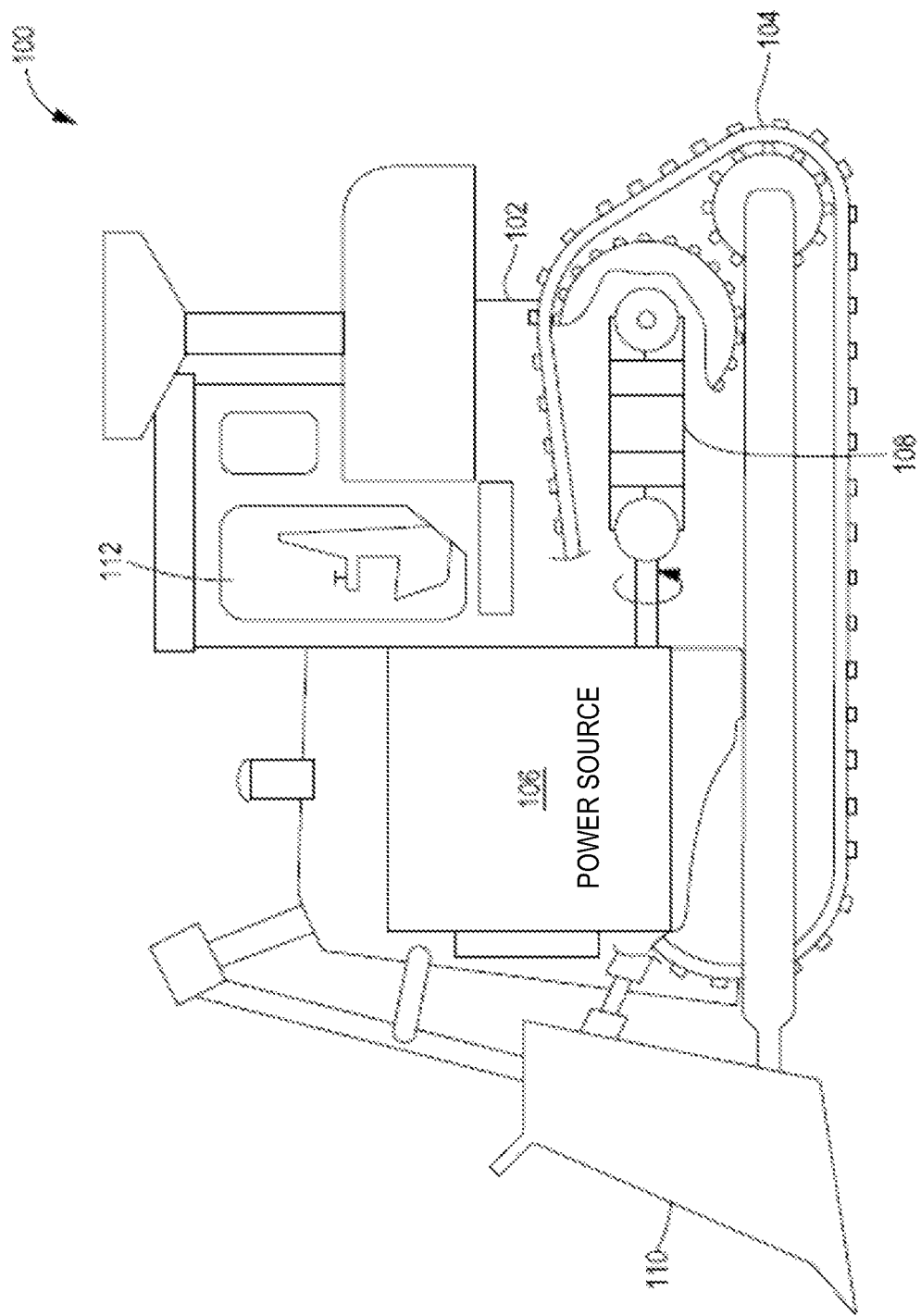
FIG. 1 is a side view of an exemplary work machine in which power-based pulse injection control for SR self-sensing in accordance with the present disclosure for an SR motor may be implemented.

FIG. 1 is a diagram of an exemplary work machine 100 that may include an SR motor control system in accordance with the present disclosure. The work machine 100 is illustrated as a track-type tractor, but may be any type of machine having an SR motor control system capable of controlling a switched reluctance motor of the work machine 100. As shown, the work machine 100 includes a frame 102, a traction system 104 supporting the frame 102, a power source 106 supported on the frame 102, and an electric drive system 108 configured to transfer energy from the power source 106 to the traction system 104. An implement 110, such as but not limited to a blade as illustrated, may be attached to the frame 102 and may be powered by the electric drive system 108. The work machine 100 may also include an operator cab 112. The power source 106 is configured to supply power to the work machine 100 and provide operating power for the propulsion of the electric drive system 108. The power source 106 may be a direct current (DC) power source, an Otto cycle or Diesel cycle engine, or the like. The power source 106 may be operably arranged to receive control signals from operator controls (not shown) in the operator cab 112. Additionally, the power source 106 may be operably arranged to power other systems of the work machine 100.

The electric drive system 108 may be operably arranged with the power source 106 to selectively propel the work machine 100 via control signals from an operator in the operator cab 112. The electric drive system 108 is operably connected to the traction system 104, which may be movably connected to the work machine 100 through axles, drive shafts, a transmission, and/or other components. In some implementations, the traction system 104 may be provided in the form of a track-drive system as shown, although a wheel-drive system, or any other type of drive system configured to engage the ground and propel the work machine 100 are possible as well.

In some implementations, the electric drive system 108 may additionally or alternatively be configured to selectively operate the implement 110, which may be movably connected to the work machine 100 and to the electric drive system 108. The illustrated implement 110 is a blade mount on the work machine 100 in the form of a tractor loader, but of course, other embodiments can include any other suitable implement for a variety of tasks, such as, but not limited to, dozing, brushing, compacting, mining, grading, lifting, ripping, plowing, or the like. As indicated above, FIG. 1 is provided as an example of a work machine 100 that may utilize the SR motor and the SR motor control system in accordance with the present disclosure. Other examples are possible and may differ from what was described in connection with FIG. 1 why still implementing the SR motor control system.

Figure 2:
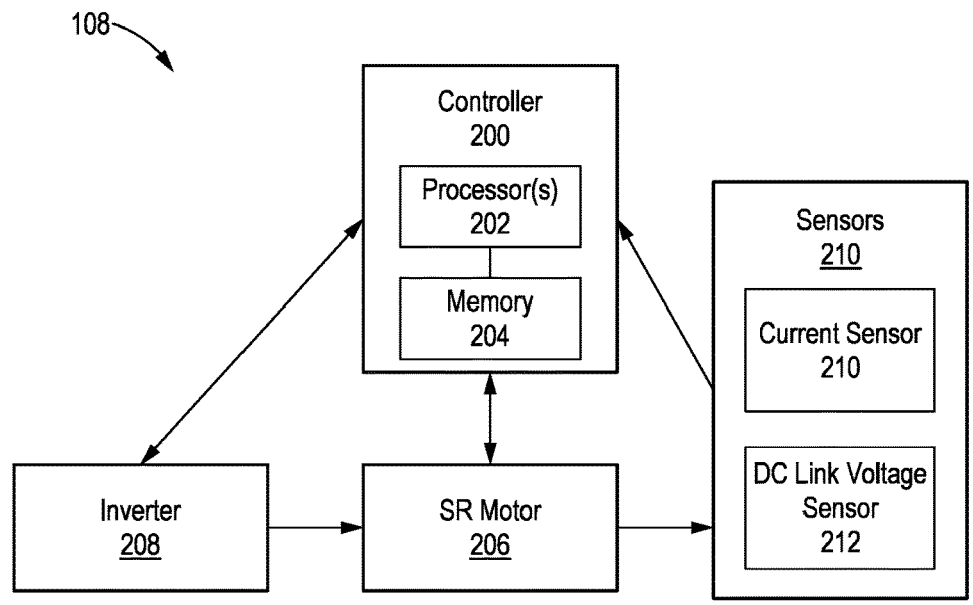
FIG. 2 is a block diagram of an exemplary electric drive system of the work machine of FIG. 1.
Figure 3:
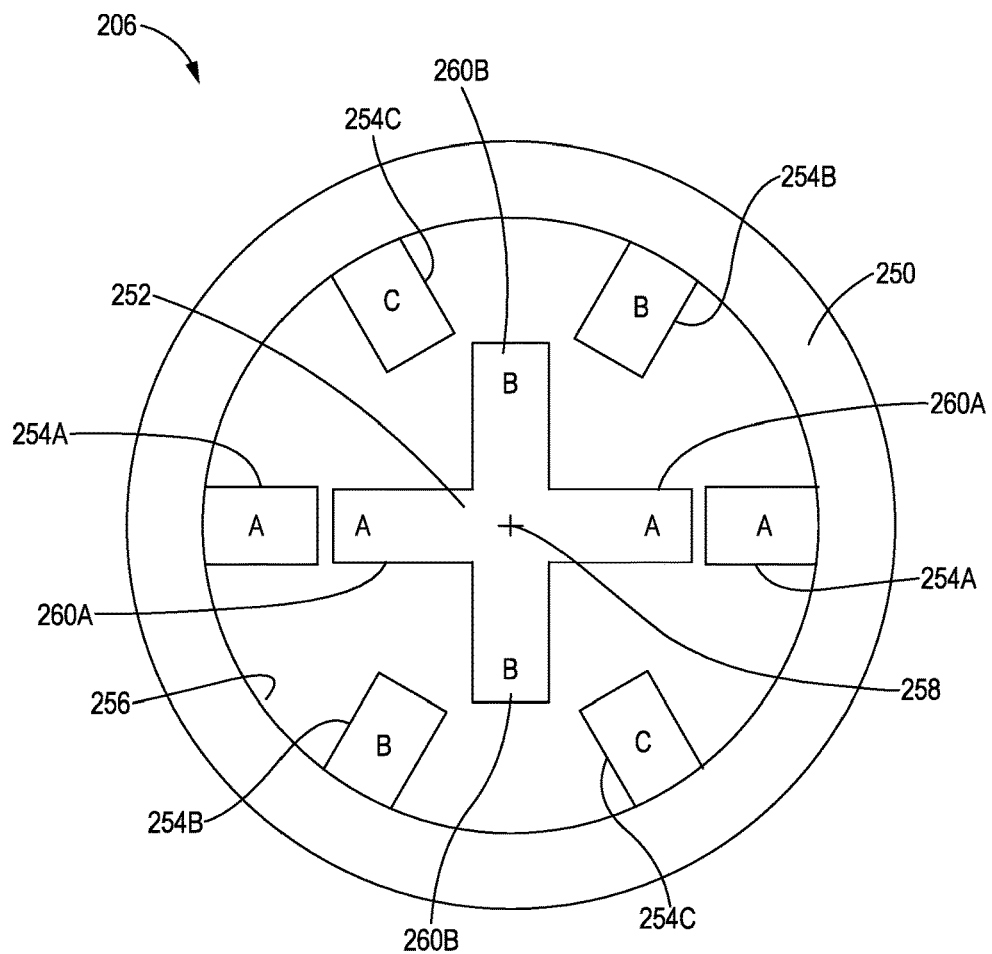
FIG. 3 is a schematic illustration of a stator and a rotor for an SR motor of the work machine of FIG. 1.

FIG. 2 is a diagram of an exemplary arrangement of components of the electric drive system 108 that may implement the SR motor control system in accordance with the present disclosure. The electric drive system 108 may include a controller 200 having one or more processors 202 and a memory 204, a motor 206, an inverter 208, and a plurality of sensors 210. The motor 206 is an SR motor 206 as shown in FIG. 3, for example, and described in more detail below. The processor 202 is implemented in hardware, firmware, or a combination of hardware and software. The processor 202 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 202 includes one or more processors capable of being programmed to perform a function. The memory 204 may include a random access memory (RAM), a read only memory (ROM), and/or other types of dynamic or static storage devices (e.g., a flash memory, a magnetic memory, and/or an optical memory) that store information and/or instructions for use by the processor 202.

In some implementations, the controller 200 may be an electronic control unit (ECU), an electronic control module (ECM), and/or the like of the work machine 100 and/or the SR motor 206. The processor 202 may execute one or more instructions and/or commands to control one or more components of the work machine 100, such as to control operation of the inverter 208, the SR motor 206, and/or the like. The memory 204 may store program code for execution by the processor 202 and/or store data in connection with execution of such program code by the processor 202, such as program code for the SR motor control system in accordance with the present disclosure.

The controller 200 may receive one or more input signals from various components of the work machine 100, may operate on the one or more input signals to generate one or more outputs signals (e.g., by executing a program using the input signals as input to the program), and may output the one or more output signals to various components of the work machine 100. For example, the controller 200 may be electronically connected (e.g., via wired or wireless connection) to the SR motor 206, to the inverter 208, to one or more sensors 210, and/or the like. The controller 200 is configured to receive inputs from the sensors 210, an operator, and/or other systems of the work machine 100. Based on those inputs, the controller 200 commands the inverter 208 to provide power to the SR motor 206 as required. This includes priming commands at start-up, switching commands during operation, and other commands as required for the SR motor control system as will be described herein.

The inverter 208 may be electrically connected to the power source 106 and the SR motor 206, and provides current to the SR motor 206 as commanded by the controller 200. In some implementations, the inverter 208 may receive a DC current from the power source 106 and may control a phase of the DC current to provide a switched DC current to the SR motor 206 based on a switching command from the controller 200. Additionally, or alternatively, the inverter 208 may receive commands relating to providing priming voltage and a current or a position sensing voltage and current to the SR motor 206 to enable the determination of the angular position of the SR motor 206 without use of a rotary position sensor. In some implementations, each phase of current may be controlled independently in parallel. Those skilled in the art will understand that the control functionality illustrated and described herein may be centralized at the controller 200, or may be distributed between the controller 200 and other "intelligent" devices. For example, in alternative embodiments, the inverter 208 may include a control device (e.g., a current controller, a phase controller, and/or the like) that controls the operation of the inverter 208 in response to the commands from the controller 200. Such variations are contemplated by the inventors.

The sensors 210 may include a set of sensor devices that provide information regarding a status of the work machine 100. For example, the sensors 210 may include a current sensor 212 that monitors current in the SR motor 206 and communicates information to the controller 200 about the current in each of several phases of the SR motor 206. Based on values of the phase currents from the current sensor 212, the SR motor control system as executed by the controller 200 may determine an estimate of an angular position of the SR motor 206 without use of a position sensor, and may determine a switching command based on the estimate of the angular position to control the operation of the SR motor 206 using the switching command. The sensors 210 may further include, among other sensors, a DC link voltage sensor 214 that senses a phase voltage that is then used to estimate the magnetic flux which is in turn used to estimate the phase current of the SR motor 206, and any other sensors 210 necessary for operation of the work machine 100.

FIG. 3 schematically illustrates the working components of an exemplary SR motor 206. The SR motor 206 includes an outer stator 250 and an inner rotor 252. The stator 250 remains stationary with respect to a housing (not shown) of the SR motor 206 while the rotor 252 is rotatable therein. The stator 250 has a plurality of stator poles 254A, 254B, 254C circumferentially spaced about an inner surface 256.

The stator poles 254A, 254B, 254C as illustrated are arranged in pairs that are diametrically opposite each other. Unlike brushed DC motors, power is delivered to the stator 250 rather than the rotor 252, which simplifies the mechanical design but complicates the electrical design because a switching system is required for the inverter 208 to deliver power to the stator poles 254A, 254B, 254C in turn. Each pair of stator poles 254A, 254B, 254C has corresponding windings (not shown) that will receive current from the inverter 208 that is in phase to generate magnetic fields to rotate the rotor 252. In the illustrated example, the current to the stator poles 254B will be 60° out of phase with the current to the to the stator poles 254A, and the current to the stator poles 254C will be 120° out of phase with the current to the stator poles 254A.

The rotor 252 in the illustrated embodiment may be fabricated from a ferromagnetic metal, alloy or other material, and may rotate about a rotor axis 258. The rotor 252 has a plurality if rotor teeth 260A, 260B circumferentially spaced about the perimeter and the rotor axis 258. The rotor teeth 260A, 260B are arranged in pairs and interact with the magnetic fields created by the current at the stator poles 254A, 254B, 254C to control the speed and direction of rotation of the rotor 252 about the rotor axis 258 as the rotor teeth 260A, 260B are pulled toward or repelled from the stator poles 254A, 254B, 254C as discussed below. The configurations of the stator 250 and the rotor 252 are exemplary, and those skilled in the art will understand that SR motors 206 may have alternative combinations of stator poles 254 and rotor teeth 260 to control the rotation of the rotor 252, and such alternatives are contemplated by the inventors as having use with power-based pulse injection control in accordance with the present disclosure.

The SR motor 206 operates on the tendency of the rotor 252 to move to a position where the inductance with respect to the stator 250 is maximized. This position of maximized inductance occurs where a pair of rotor teeth 260A, 260B is aligned with a pair of energized stator poles 254A, 254B, 254C. This magnetic attraction produces a torque causing the rotor 252 to rotate and move towards the maximized inductance position. As power is delivered to each pair of stator poles 254A, 254B, 254C and the rotor 252 moves into alignment therewith, the next stator poles 254A, 254B, 254C in sequence are then energized to continue the movement of the rotor 252 and maintain angular momentum. This pattern of switching which stator poles 254A, 254B, 254C are energized and which are not, along with which phase, complicates operation of such motors. Proper operation of the SR motor 206 is dependent on the proper timing at which each stator poles 254A, 254B, 254C is energized. That timing is driven by the angular position of the rotor 252 relative to the stator 250.

Figures 4, 5, 5A:
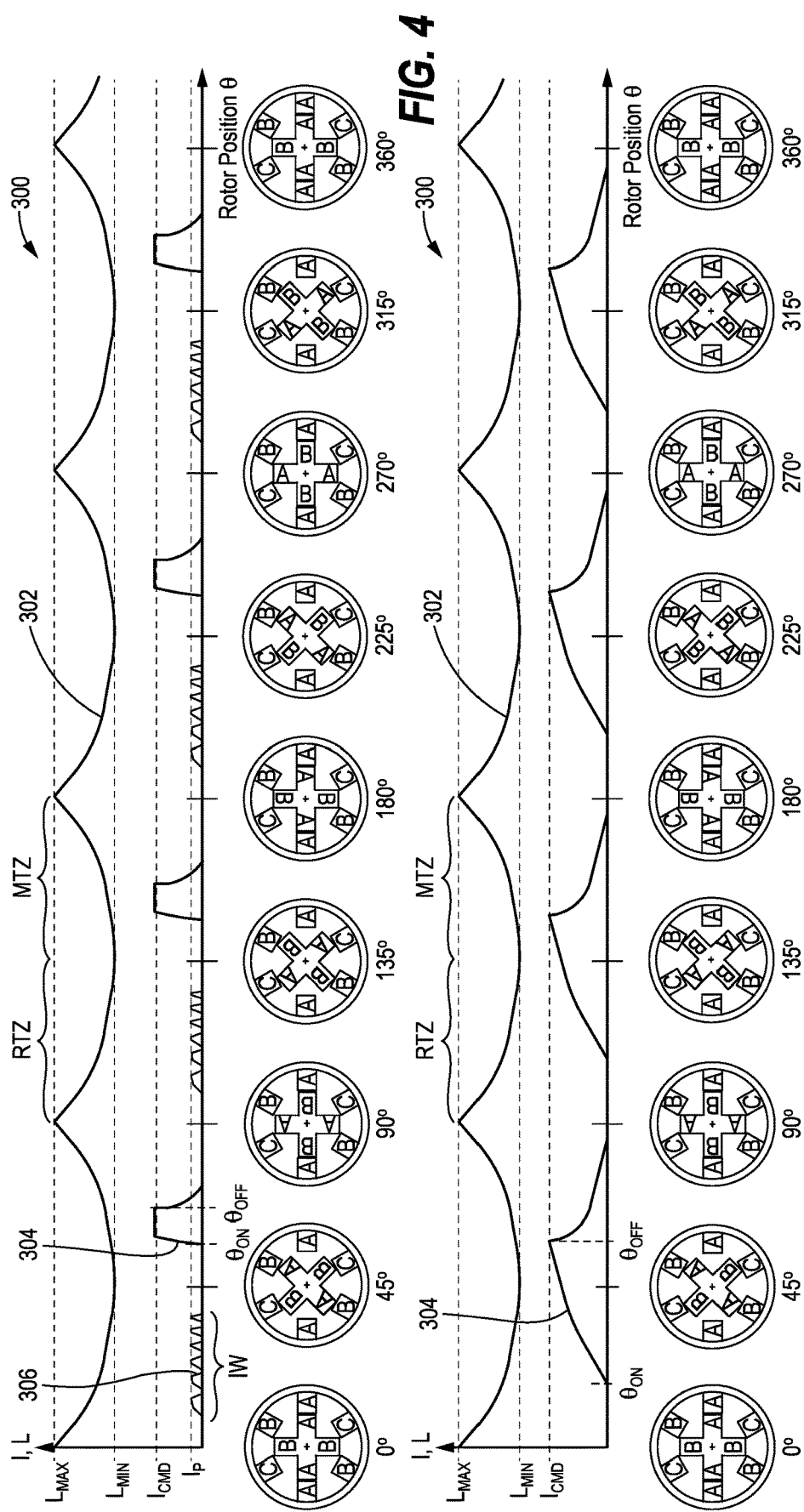
FIG. 4 is a graph of rotor position versus current and inductance for the SR motor of FIG. 3 at low speed and high load conditions.
FIG. 5 is a graph of rotor position versus current and inductance for the SR motor of FIG. 3 at medium-to-high speed and high load conditions.
FIG. 5A is a graph of time versus current and inductance for the SR motor of FIG. 3 at medium-to-high speed and high load conditions.

FIG. 4 graphically illustrates control of the SR motor 206 by providing current to the stator poles 254A, 254B, 254C at specified intervals to cause the rotor 252 to rotate counterclockwise as shown. A graph 300 illustrates the angular position θ of the rotor 252 versus the current I transmitted to the windings of the stator poles 254A under conditions where the SR motor 206 is operating at a low speed with a full load. The stator 250 and the rotor 252 are shown in the series beneath the graph 300 with the rotor 252 rotated at 45° increments. At the 0° position, the rotor teeth 260A are aligned with the stator poles 254A. In this position, machine inductance L between the stator poles 254A and the rotor 252 is at a maximum inductance $L_{MAX}$ on an inductance curve 302 due to the alignment of the rotor teeth 260A with the stator poles 254A. The inductance L will decrease as the rotor teeth 260A rotate out of alignment with the stator poles 254A until reaching a minimum inductance $L_{MIN}$ after 45° of rotation when the rotor teeth 260A are equidistant from the stator poles 254A. The SR motor 206 is in a motoring torque zone MTZ as the rotor 252 rotates between the minimum inductance $L_{MIN}$ and the maximum inductance $L_{MAX}$ where current to the stator poles 254A will create a motoring torque on the rotor 252 in the direction of rotation. Conversely, the SR motor 206 is in a retarding torque zone RTZ as the rotor 252 rotates between the maximum inductance $L_{MAX}$ and the minimum inductance $L_{MIN}$ where current to the stator poles 254A will create a retarding torque on the rotor 252 opposite the direction of rotation. Those skilled in the art will understand that the motoring torque zone MTZ and the retarding torque zone RTZ are direction-dependent and are reversed when the SR motor 206 operates in reverse. The rotor 252 continues through cycles between the maximum inductance $H_{MAX}$ and the minimum inductance $H_{MIN}$ as the rotor teeth 260A pass into and out of alignment with the stator poles 254A.

Rotation of the rotor 252 in the counterclockwise direction is maintained by sending a command current $I_{CMD}$ to the stator poles 254A in the motoring torque zone MTZ. A command torque $T_{CMD}$ and the command current $I_{CMD}$ necessary to operate the SR motor 206 may be determined by the SR motor control system at the controller 200 based on operator inputs and the current operating conditions at the work machine 100. As the rotor 252 passes the 45° position, the rotor teeth 260A rotate farther away from the stator poles 254A and the rotor teeth 260B rotate toward the stator poles 254A. When the rotor 252 reaches a command current on position $\theta_{ON}$, the controller 200 causes the inverter 208 to transmit a command current pulse 304 to the windings of the stator poles 254A until a command current off position $\theta_{OFF}$ to create a magnetic field that pulls the rotor teeth 260B toward the stator poles 254A. The controller 200 controls the value of the command current $I_{CMD}$ and a dwell period between the positions $\theta_{ON}$ and $\theta_{OFF}$ as necessary to control whether the angular velocity ω of the rotor 252 increases, decreases or remains constant. Similar command current pulses 304 will occur at approximately 90° intervals as the speed of and load on the SR motor 206 remain constant. The stator poles 254B, 254C are controlled in a similar manner by command current pulses 304 that are 60° and 120°, respectively, out of phase with the command current pulses 304 to the stator poles 254A. Those skilled in the art will understand that the controller 200 varies the timing, duration and polarity of the command current pulses 304 to speed up, slow down or reverse the rotation of the rotor 252 to control the operation of the SR motor 206.

Efficient operation of the SR motor 206 is dependent on knowing the position of the rotor 252 so that the command current pulses 304A, 304B, 304C are initiated at the correct command current on position $\theta_{ON}$ in the rotation of the rotor 252. Although some SR motors 206 in the art use position sensors to detect the position of the rotor 252 relative to the stator 250, self-sensing operation is important for various applications due to the need for minimum package size, high reliability and low cost for the SR motors 206. Reliable and accurate position sensing for SR motors 206 is a key step towards developing low-cost, high-performance SR work machine drives. One strategy for self-sensing the angular position ω of the rotor 252 involves injecting a position current pulse 306 having a position current $I_P$ into the stator poles 254A, 254B, 254C during an injection window IW where the command current pulse 304 is not generated by the stator poles 254A, 254B, 254C. The timing of the position current pulse 306 is based on an estimated rotor position $\theta_{EST}$ and an estimated rotor speed $\omega_{EST}$ stored in the memory 204. An estimated stator current $I_{EST}$ flowing through the corresponding stator pole 254A, 254B, 254C for the estimated rotor position $\theta_{EST}$ at the time of the position current pulse 306 is then determined using an observer-based estimation approach. The position current $I_P$ of the position current pulse 306 may have a magnitude large enough to cause a measurable change in the current measured by the current sensor 212 but without causing a parasitic retarding torque on the rotor 252 that is significant enough to impact performance of the SR motor 206 that is outweighs the benefit of self-sensing the rotor position θ. The controller 200 compares the estimated stator current $I_{EST}$ to an actual stator current $I_{ACT}$ received from the current sensor 212 to generate an error signal. The error signal is used to compute an updated estimated rotor position $\theta_{EST}$ and an updated estimated rotor speed $\omega_{EST}$ of the rotor 252 that may be stored in the memory 204 for use in timing subsequent command current pulses 304.

The strategy for determining the estimated rotor position $\theta_{EST}$ works well at low speeds, but may present difficulty at higher operating speeds. As shown in FIG. 5, which represents the graph 300 for the stator poles 254A at a higher operating speed of the SR motor 206, the command current on rotor position $\theta_{ON}$ occurs within the retarding torque zone RTZ so that the command current pulse 304 can reach the command current $I_{CMD}$ at the appropriate rotor position θ to pull the corresponding rotor teeth 260A, 260B toward the stator poles 254A. Due to the location and timing of the command current on rotor position $\theta_{ON}$, the opportunity for an injection window IW for a position current pulse 306 is greatly reduced or eliminated. FIG. 5A illustrates the graph 300 where the rotor position axis is changed to a time axis to represent a rotor speed ω that is approximately 5 times greater than the rotor speed ω in FIG. 4. This graphically illustrates that the time for injecting a position current pulse 306 may be greatly reduced along with the range of rotor positions θ within which to inject the position current pulse 306.

Figure 6:
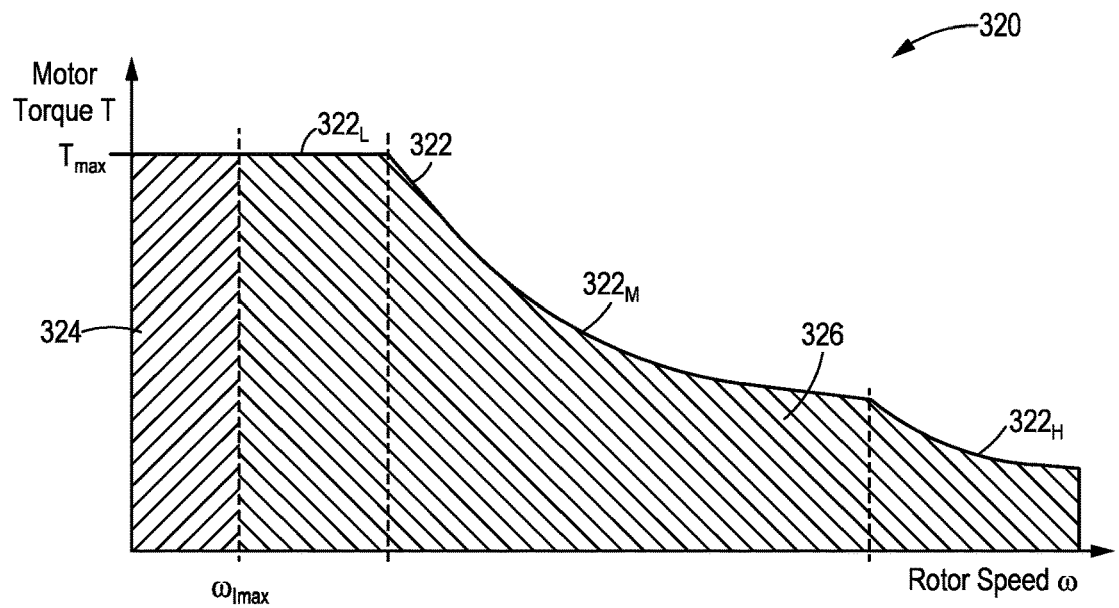
FIG. 6 is a graph of rotor speed versus motor torque for the SR motor of FIG. 3.

FIG. 6 is a graph 320 of a known position self-sensing strategy. The graph 320 represents the motor speed ω versus the motor torque T for an exemplary SR motor 206. A power curve 322 represents a maximum operating power $P_{MAX}$ for the SR motor 206 for combinations of motor torque T and rotor speed ω. The SR motor 206 has a low speed range $322_L$ with a maximum output torque $T_{MAX}$, a medium or intermediate speed range $322_M$ with a constant maximum power output equal to the motor torque T times the motor speed ω, and a high-speed range $322_H$ or continuous conduction region where the current never completely goes to zero resulting in a different machine power curve geometry than in the medium speed range $322_M$. In the exemplary SR motor 206, position self-sensing as described above may be performed within the low speed range $322_L$ up to an injection maximum rotor speed $\omega_{IMAX}$ in a speed-based injection self-sensing region 324. Above the injection maximum rotor speed $\omega_{IMAX}$, motor position self-sensing may be performed in a main current-based self-sensing region 326 based off the main command current pulses 304A, 304B, 304C utilizing a similar strategy of evaluating the measured inductance H or flux flow.

This method for main current-based position self-sensing requires a minimum current to the SR motor 206. At very low torque loads and medium-to-high rotor speeds, the power required to drive the load is relatively low, and the rotor speed ω can be maintained with a low command current $I_{CMD}$. The command current $I_{CMD}$ required to rotate the rotor 252 may be too low for the process of injection, measurement and comparison to correctly function, thereby creating a dead-band in which the controller 200 cannot determine the position of the rotor 252. Despite the low power requirements in the low torque/medium-to-high speed conditions, it is still desirable to maintain up-to-date information on the rotor position θ for optimal operation of the SR motor 206.

Figure 7:
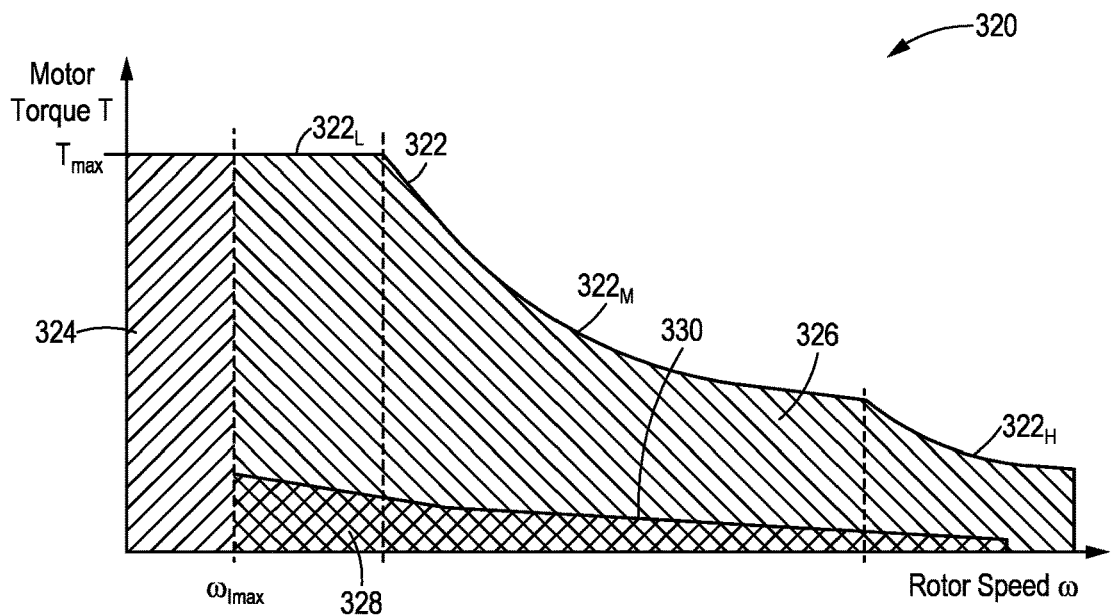
FIG. 7 is the graph of FIG. 6 including a power-based injection self-sensing region in accordance with the present disclosure.

An SR motor control system in accordance with the present disclosure for the SR motor 206 may be implemented through the controller 200 and is configured to determine the estimated rotor position $\theta_{EST}$ when the SR motor 206 is operating at medium-to-high speeds with low torque. As shown in FIG. 7, the position self-sensing strategy of the graph 320 is modified to include a power-based injection self-sensing region 328 carved out of the main current-based self-sensing region 326 at estimated rotor speeds $\omega_{EST}$ greater than the injection maximum rotor speed $\omega_{IMAX}$ where the SR motor 206 is driving low torque loads. The power-based injection self-sensing region 328 is defined by a self-sensing power curve 330 indicating an injection maximum power $P_{IMAX}$ below which the controller 200 may inject position current pulses 306 as discussed further below. As the SR motor 206 is operating, a motor power $P_M$ may be calculated as the product of the command torque $T_{CMD}$ used to control the SR motor 206 and the estimated rotor speed $\omega_{EST}$ stored in the memory 204. If the estimated rotor speed $\omega_{EST}$ is greater than the injection maximum rotor speed $\omega_{IMAX}$, and the motor power $P_M$ is less than the injection maximum motor power $P_{IMAX}$, then the estimated motor position $\theta_{EST}$ may be determined using position current pulses 306 at the stator poles 254A, 254B, 254C.

FIG. 8 illustrates a graph 340 for the stator poles 254A where the SR motor 206 may be operating at a low rotor speed ω and a low torque T. Position self-sensing using position current pulses 306 may be performed if the motor speed $\omega_M$ is less than the injection maximum rotor speed $\omega_{IMAX}$ or the motor power $P_M$ is less than the injection maximum motor power $P_{IMAX}$. If the current motor operating conditions are in either injection self-sensing region 324, 328, the position current pulse 306 will be injected during the injection window IW as discussed above. The position current pulses 306 will be injected in a similar manner for the stator poles 254B, 254C.

The graph 340 for the stator poles 254A is illustrated in FIG. 9 for a medium-to-high rotor speed $\omega_M$ with low torque on the SR motor 206. Because the command current $I_{CMD}$ is lower than in the high torque case, the command current on rotor position $\theta_{ON}$ for the command current pulse 304 can occur later in the retarding torque zone RTZ. The later injection of the command current pulse 304 results in an opportunity for an injection window IW that is large enough for injection of the position current pulse 306. The opportunity is apparent even in the time domain version of the graph 340 shown in FIG. 9A.

INDUSTRIAL APPLICABILITY

Figure 10:
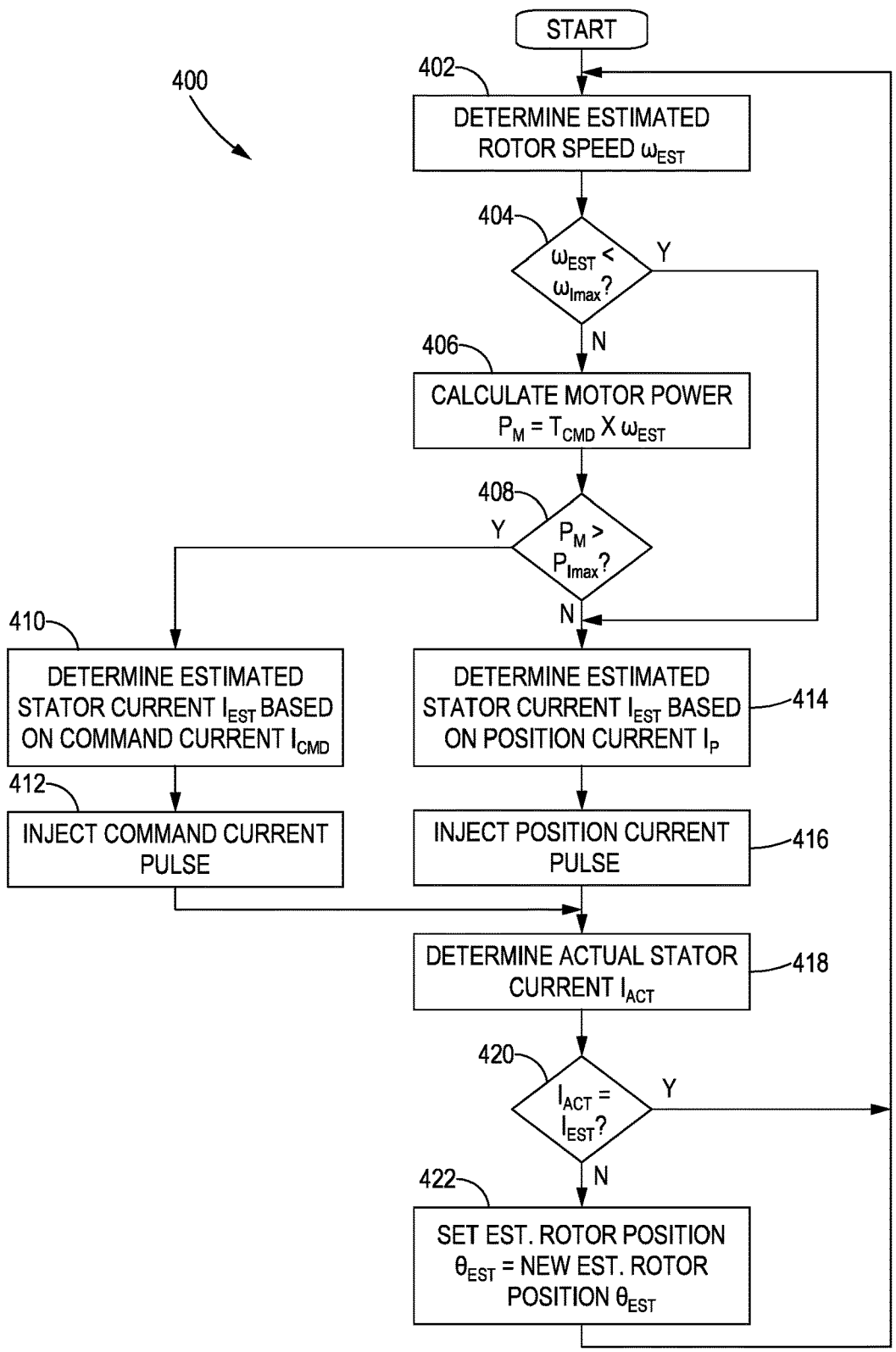
FIG. 10 is a flow diagram of an exemplary SR rotor position self-sensing routine in accordance with the present disclosure for the SR motor of FIG. 3.

FIG. 10 illustrates an exemplary SR rotor position self-sensing routine 400 that may be implemented as part of an SR motor control system in accordance with the present disclosure. The routine 400 may implement the self-sensing injection based rotor position detection at low rotor speeds and low power operating conditions as depicted in the graph 320 of FIG. 7. The routine 400 may begin at a block 402 where the controller 200 may determine the estimated rotor speed $\omega_{EST}$ for the rotor 252 of the SR motor 206. In some embodiments as discussed above, the estimated rotor speed $\omega_{EST}$ may have been previously calculated when the estimated rotor position $\theta_{EST}$ was last updated and stored in the memory 204. In these implementations, the stored estimated rotor speed $\omega_{EST}$ may be retrieved from the memory 204 for use in the routine 400. In other implementations, the estimated rotor speed $\omega_{EST}$ may be determined in real time from available data such as data in signals from the current sensor 212 or data provide from other sensors 210 such as a rotational speed sensor (not shown).

After the estimated rotor speed $\omega_{EST}$ is retrieved or calculated at the block 402, control may pass to a block 404 where the controller 200 may determine whether the SR motor 206 is operating in the speed-based injection self-sensing region 324 by comparing the estimated rotor speed $\omega_{EST}$ to the injection maximum rotor speed $\omega_{Imax}$. If the estimated rotor speed $\omega_{EST}$ is less than the injection maximum rotor speed $\omega_{Imax}$, the SR motor 206 is operating in the speed-based injection self-sensing region 324 and the position current pulses 306 can be injected to determine if the current estimated rotor speed $\omega_{EST}$ is accurate. In this case, the routine may bypass steps for determining whether the SR motor 206 is operating in the power-based injection self-sending region 328 and proceed to steps for injection-based rotor position self-sensing.

If the estimated rotor speed $\omega_{EST}$ is greater than the injection maximum rotor speed $\omega_{Imax}$, the SR motor 206 has a medium-to-high rotor speed ω and is not operating in the speed-based injection self-sensing region 324. Instead, the SR motor 206 is operating in either the main current-based self-sensing region 326 or the power-based injection self-sensing region 328. At the medium-to-high rotor speeds W, control may pass to a block 406 where the controller 200 may determine the current motor power PM for the SR motor 206 by multiplying the command torque $T_{CMD}$ by the estimated rotor speed $\omega_{EST}$ previously determined at the block 402.

After determining the motor power $P_M$ at the block 406, control may pass to a block 408 where the controller 200 may compare the calculated motor power $P_M$ to the injection maximum power $P_{IMAX}$ to determine in which of the self-sensing regions 326, 328 the SR motor 206 is operating. If the motor power $P_M$ is greater than the injection maximum power $P_{IMAX}$, the SR motor 206 is operating above the self-sensing power curve 330 and in the main current-based self-sensing region 326. In this case, control may pass from the block 408 to a block 410 where the controller 200 determines an estimated stator current JEST based on the command current $I_{CMD}$ of the command current pulses 304 that are being output by the stator poles 254A, 254B, 254C to drive the rotor 252. The estimate stator current JEST may be determined by the controller 200 using the observer-based estimation approach as described above or any other appropriate method for determining the current flowing through the SR motor 206 during the command current pulses 304. With the estimated stator current JEST determined at the block 410, control may pass to a block 412 where the controller 200 causes the inverter 208 to inject the command current pulse 304 to the corresponding stator pole 254A, 254B, 254C at the command current on rotor position $\theta_{ON}$ and to cut off the command current $I_{CMD}$ at the command current off rotor position $\theta_{OFF}$.

If the motor power $P_M$ is less than the injection maximum power $P_{IMAX}$ at the block 410, the SR motor 206 is operating below the self-sensing power curve 330 and in the power-based injection self-sensing region 328. Under these conditions, control may pass from the block 410 to a block 414 where the controller 200 determines the estimated stator current $I_{EST}$ based on the position current $I_{CMD}$ of the position current pulses 306 that will be output by the stator poles 254A, 254B, 254C to determine the estimated rotor position $\omega_{EST}$. The estimate stator current $I_{EST}$ may be determined by the controller 200 using the observer-based estimation approach as described above or any other appropriate method for determining the current that will flow through the SR motor 206 during the position current pulses 306. With the estimated stator current $I_{EST}$ determined at the block 414, control may pass to a block 416 where the controller 200 causes the inverter 208 to inject the position current pulse 306 to the corresponding stator pole 254A, 254B, 254C within the injection window IW.

Whether after injection of the command current pulse 304 at the block 412 or injection of the position current pulse 306 at the block 416, control may pass to a block 418 where the controller 200 determines the actual stator current $I_{ACT}$ flowing through the SR motor 206 during the current pulse 304, 306. The actual stator current $I_{ACT}$ may be the current detected by the current sensor 212 and transmitted to the controller 200 as described above. In alternative embodiments, the actual current $I_{ACT}$ may be determined by other know methods. After the actual current $I_{ACT}$ is determined at the block 418, control may pass to a block 420 where the controller 200 may compare the actual current $I_{ACT}$ to the estimated current $I_{EST}$. As discussed above, the current comparison may generate an error signal. If the generated error signal indicates that the currents $I_{ACT}$, $I_{EST}$ are equal or are within an acceptable error range at the block 420, control may pass back to the block 402 without updating the estimated rotor position $\theta_{EST}$ store in the memory 204 and to begin the next cycle of rotor position self-sensing under the routine 400. If the generated error signal indicates that the currents $I_{ACT}$, $I_{EST}$ are not equal and differ by more than the acceptable error range at the block 420, control may pass to a block 422 where the controller 200 may update the estimated rotor position $\theta_{EST}$ stored in the memory 204 to the new estimated rotor position $\theta_{EST}$ indicated by the actual stator current $I_{ACT}$. The error signal is used to compute the new estimated rotor position $\theta_{EST}$ and a new estimated rotor speed $\omega_{EST}$ of the rotor 252, and both values may be stored in the memory 204 for use in timing subsequent command current pulses 304. After the estimated rotor position $\theta_{EST}$ is stored in the memory 204, control may pass back to the block 402 to begin the next cycle of rotor position self-sensing under the routine 400.

The SR motor control system in accordance with the present disclosure finds application in many different industries, including, but not limited to, earth moving equipment, construction, agriculture, mining, and the like. More specifically, the power-based injection rotor positing self-sensing strategy disclosed here is important for various applications where rotor position self-sensing is desirable due to the need for minimum package size, high reliability and low cost for SR motor-driven work machines. Reliable and accurate rotor position sensing for SR motors is a key step towards developing low-cost, high-performance SR work machine drives. The SR motor control system illustrated and described herein extends that reliability and accuracy to low power operating conditions with very low torque loads and medium-to-high rotor speeds that created a dead-band in previously known control strategies where the command current $I_{CMD}$ required to run the SR motor 206 may be too low to determine an estimated rotor position $\theta_{EST}$. The present SR motor control system offers more complete coverage of control for reliable operation of SR motors 206 across the spectrum of operating conditions.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A work machine, comprising:
a power source;
a switched reluctance (SR) motor having a stator and a rotor;
an inverter operatively connected to the power source and the SR motor to control transfer of power from the power source to the SR motor; and
a controller operatively connected to the SR motor and the inverter, the controller being configured to:
calculate a motor power that is output by the SR motor,
compare the motor power to an injection maximum power,
determine an estimated stator current for the SR motor based on a position current of a position current pulse to be injected to a stator pole of the SR motor to estimate a rotor position in response to the motor power being less than the injection maximum power,
cause the inverter to inject the position current pulse with the position current to the stator pole of the SR motor in response to the motor power being less than the injection maximum power,
determine an actual stator current of the SR motor created by the position current pulse,
compare the actual stator current to the estimated stator current, and
set a stored estimated rotor position in a memory equal to a new estimated rotor position in response to determining that the actual stator current is not equal to the estimated stator current by an error amount that is greater than a predetermined error amount.

2. The work machine of claim 1, wherein the controller is configured to:
determine an estimated rotor speed of the rotor of the SR motor;
compare the estimated rotor speed to an injection maximum rotor speed; and
execute the calculate motor power step in response to determining that the estimated rotor speed is greater than the injection maximum rotor speed.

3. The work machine of claim 2, wherein the controller is configured to omit the calculate the motor power step in response to determining that the estimated rotor speed is less than the injection maximum rotor speed.

4. The work machine of claim 1, wherein the controller is configured to:
determine an estimated rotor speed of the rotor of the SR motor;
determine a motor torque of the SR motor; and
calculate the motor power by multiplying the motor torque by the estimated rotor speed.

5. The work machine of claim 4, wherein the controller is configured to determine the estimated rotor speed by reading the memory for a stored estimated rotor speed.

6. The work machine of claim 1, wherein the controller is configured to:
determine the estimated stator current for the SR motor based on a command current of a command current pulse to be injected to the stator pole of the SR motor to estimate the rotor position in response to the motor power being greater than the injection maximum power;
cause the inverter to inject the command current pulse with the command current to the stator pole of the SR motor in response to the motor power being greater than the injection maximum power; and
determine the actual stator current of the SR motor created by the command current pulse.

7. The work machine of claim 6, wherein the controller is configured to determine the actual stator current of the SR motor created by the command current pulse.

8. A method for self-sensing a rotor position of a rotor of a switched reluctance (SR) motor, comprising:
calculating a motor power that is output by the SR motor;
comparing the motor power to an injection maximum power;
determining an estimated stator current for the SR motor based on a position current of a position current pulse to be injected to a stator pole of the SR motor to estimate the rotor position in response to the motor power being less than the injection maximum power;
injecting the position current pulse with the position current to the stator pole of the SR motor in response to the motor power being less than the injection maximum power;
determining an actual stator current of the SR motor created by the position current pulse;
comparing the actual stator current to the estimated stator current; and
setting a stored estimated rotor position equal to a new estimated rotor position in response to determining that the actual stator current is not equal to the estimated stator current by an error amount that is greater than a predetermined error amount.

9. The method of claim 8, comprising:
determining an estimated rotor speed of the rotor of the SR motor;
comparing the estimated rotor speed to an injection maximum rotor speed; and
executing the calculating the motor power step in response to determining that the estimated rotor speed is greater than the injection maximum rotor speed.

10. The method of claim 9, comprising omitting the calculating the motor power step in response to determining that the estimated rotor speed is less than the injection maximum rotor speed.

11. The method of claim 8, comprising:
determining an estimated rotor speed of the rotor of the SR motor; and
determining a motor torque of the SR motor,
wherein calculating the motor power comprises multiplying the motor torque by the estimated rotor speed.

12. The method of claim 11, determining the estimated rotor speed comprises reading a memory for a stored estimated rotor speed.

13. The method of claim 8, comprising:
determining the estimated stator current for the SR motor based on a command current of a command current pulse to be injected to the stator pole of the SR motor to estimate the rotor position in response to the motor power being greater than the injection maximum power;
injecting the command current pulse with the command current to the stator pole of the SR motor in response to the motor power being greater than the injection maximum power; and
determining the actual stator current of the SR motor created by the command current pulse.

14. The method of claim 13, comprising determining the actual stator current of the SR motor created by the command current pulse.

15. An electric drive system for a work machine having a frame, a traction system supporting the frame, and a power source mounted on the frame, the electric drive system comprising:
a switched reluctance (SR) motor having a stator and a rotor;
an inverter operatively connected to the power source and the SR motor to control transfer of power from the power source to the SR motor;
a current sensor operatively connected to the SR motor; and
a controller operatively connected to the SR motor, the inverter and the current sensor, the controller being configured to:
calculate a motor power that is output by the SR motor,
compare the motor power to an injection maximum power,
determine an estimated stator current for the SR motor based on a position current of a position current pulse to be injected to a stator pole of the SR motor to estimate a rotor position in response to the motor power being less than the injection maximum power,
cause the inverter to inject the position current pulse with the position current to the stator pole of the SR motor in response to the motor power being less than the injection maximum power,
determine an actual stator current of the SR motor created by the position current pulse based on current sensor signals from the current sensor,
compare the actual stator current to the estimated stator current, and
set a stored estimated rotor position in a memory equal to a new estimated rotor position in response to determining that the actual stator current is not equal to the estimated stator current by an error amount that is greater than a predetermined error amount.

16. The electric drive system of claim 15, wherein the controller is configured to:
determine an estimated rotor speed of the rotor of the SR motor;
compare the estimated rotor speed to an injection maximum rotor speed; and execute the calculate motor power step in response to determining that the estimated rotor speed is greater than the injection maximum rotor speed.

17. The electric drive system of claim 16, wherein the controller is configured to omit the calculate the motor power step in response to determining that the estimated rotor speed is less than the injection maximum rotor speed.

18. The electric drive system of claim 15, wherein the controller is configured to:
   determine an estimated rotor speed of the rotor of the SR motor based on the current sensor signals from the current sensor;
   determine a motor torque of the SR motor; and
   calculate the motor power by multiplying the motor torque by the estimated rotor speed.

19. The electric drive system of claim 15, wherein the controller is configured to:
   determine the estimated stator current for the SR motor based on a command current of a command current pulse to be injected to the stator pole of the SR motor to estimate the rotor position in response to the motor power being greater than the injection maximum power;
   cause the inverter to inject the command current pulse with the command current to the stator pole of the SR motor in response to the motor power being greater than the injection maximum power; and
   determine the actual stator current of the SR motor created by the command current pulse.

20. The electric drive system of claim 19, wherein the controller is configured to determine the actual stator current of the SR motor created by the command current pulse based on the current sensor signals from the current sensor.

* * * * *